United States Patent Office 3,317,471
Patented May 2, 1967

3,317,471
THERMOPLASTIC RESINOUS REACTION PRODUCT OF A DIGLYCIDYL ETHER AND AN AMINO COMPOUND
Wilbur E. Johnson, Lake Jackson, Tex., and Walter A. Henson, Midland, Mich., assignors to The Dow Chemical Company, Midland, Mich., a corporation of Delaware
No Drawing. Filed Mar. 12, 1959, Ser. No. 798,854
2 Claims. (Cl. 260—47)

The present invention relates to thermoplastic resinous compositions of matter and more particularly to a new class of linear thermoplastic resinous compositions which are capable of being molded, extruded or drawn into useful shapes such as sheets, films or fibers and which new compositions are capable of reacting with organic polyisocyanates, monocarboxylic acids and dicarboxylic acids to form polyurethanes, polyesters, alkyd-type compositions, and the like.

It has now been found that a linear thermoplastic resinous composition can be prepared by reacting in substantially stoichiometric proportions a diglycidyl ether of a polyhydroxy organic compound and an amine compound having only two amine hydrogen atoms. The reaction is carried out at temperatures of from about 20° to about 250° C. Good results are obtained when the reactants are employed in substantially equimolecular proportions. The reaction is somewhat exothermic and the temperature conveniently can be controlled by external cooling and/or controlled addition of the reactants.

The new composition is the first linear epoxy resin known to the industry. The prior known "cured" epoxy resins were all cross-linked thermoset resins which could not be worked after "curing." The advantages of the new linear resins over the older thermosetting resins are obvious. Thus, for example, the new resins can be repeatedly molded, extruded or drawn whereas the thermosetting resins must be cured in shape and are usually subject to degradation before any softening is apparent.

The diglycidyl ethers of dihydroxy organic compounds employed as starting materials in accordance with the present invention are compounds generally classed by the formula

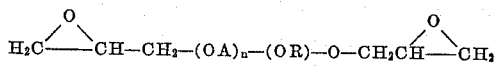

wherein A is a radical having the general formula

—R—O—CH$_2$CHOHCH$_2$— wherein R represents a divalent organic radical of a polyhydric phenol or alcohol, and $n$ is an integer from 0 to 20, thus one can employ substantially any diglycidyl ether of a polyhydroxy compound as, for example, the diglycidyl ether of p,p'-methylene bisphenol, p,p'-ethylene bisphenol, p,p'-trimethylene bisphenol, p,p'-isopropylidene bisphenol, p,p' - tetramethylene bisphenol, p,p'-hydroquinone, resorcinol, catechol, and the lowerpoly-

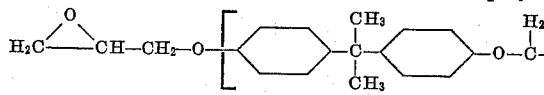

mers of these diglycidyl ethers such as the dimers, trimers and the like, the novolaks, their halogenated and hydrogenated derivatives, ethylene glycol, 1,3-propylene glycol, 1,2-propylene glycol, polyalkylene glycols, glycerol, the epoxy resins such as Dow DER, 331, 332, 661, 664, 667, The Epons of Shell Chemical and the like.

The active-hydrogen compounds which are operative in the present invention are the basic nitrogenous compounds which have two amino hydrogens per molecule. Thus, ethanolamine, propanolamine, methylamine, ethylamine, propylamine, butylamine, aniline, furfurylamine, orthoaminophenol, dimethylurea, piperazine, and C-methylpiperazines and the like, may be employed.

The following examples illustrate the present invention but are not to be construed as limiting:

Example 1

40.5 gm. (representing 0.24 equivalents) of diglycidyl ether of Bisphenol A and 7.6 gm. of monoethanolamine (representing 0.25 equivalents) were combined in a flask and stirred with a slight warming until reaction began. When the reaction had proceeded until the temperature in the flask was about 200° C. and the contents had become quite fluid, the contents were poured onto a flat sheet of aluminum foil and allowed to cool to room temperature. The cooled product was a clear, friable solid, having a very slight yellow color. This solid product was ground to granules and found to be easily flow-molded in a platen press at 175° C. Such a molded sample was re-ground to granules and was readily re-molded under the same conditions. It readily lent itself to the preparation of fibers and films.

Example 2

41.7 grams (representing 0.245 equivalents) of diglycidyl ether of Bisphenol A and 11.64 grams of aniline (representing 0.025 equivalents) were combined in a flask and stirred with warming until reaction began. When the reaction had proceeded until the temperature in the flask was about 220° C. and the contents quite fluid the contents were poured onto a flat sheet of aluminum foil and allowed to cool to room temperature. The cooled product was a clear, friable solid having a very slight yellow color. This solid product was ground to granules and found to be easily flow-molded in a platen press at 175° C. Such a molded sample was re-ground to granules and was readily re-molded under the same conditions.

In a similar manner other diglycidyl ethers may be employed to prepare linear thermoplastic resinous compositions which are suitable for forming self-supporting films and/or fibers.

Example 3

537.5 grams (.5 mole) of a diglycidyl ether which is a Bisphenol A-epichlorohydrin condensate resin having 8.00% by weight of epoxy content, was reacted with 31.0 grams (.508 mole) of ethanolamine in the presence of 568 grams of diethylene glycol ditert-butyl ether as the solvent. After heating for 2 hours at 110° C., the solution was devolatilized using a good vacuum with controlled heat at 200° C., to obtain a light yellow resinous product which could be molded or drawn-out into flexible fibers.

We claim:
1. A linear, thermoplastic resin consisting essentially of the product formed by the reaction of substantially equimolecular proportions of a diglycidyl ether of a dihydroxy organic compound having the formula

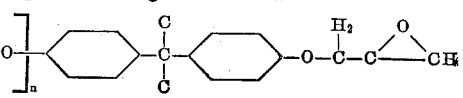

wherein $n$ represents an integer from 0 to 20 and a compound having only two amine hydrogen atoms selected from the group consisting of alkanolamines and aniline, said reaction being effected by mixing said reactants and heating the resulting mixture at a temperature of about 20 to 250° C. until the reaction is substantially complete.

2. A linear, thermoplastic resin consisting essentially of the product formed by the reaction of substantially equimolar proportions of a diglycidyl ether of a polyhydroxy organic compound having the formula

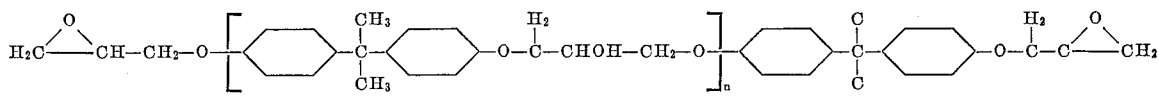

wherein n represents an integer from 0 to 20 and a compound having only 2 amine hydrogens selected from the group consisting of alkanolamines and aniline, said reaction being effected by mixing the reactants and heating in the presence of a non-reactive solvent for the resultant resin, followed by devolatilization of the resin solution.

References Cited by the Examiner

UNITED STATES PATENTS

| | | | |
|---|---|---|---|
| 2,136,928 | 11/1938 | Schlack | 260—2 |
| 2,599,974 | 6/1952 | Carpenter et al. | 260—47 |
| 2,642,412 | 6/1953 | Newey et al. | 260—47 |
| 2,723,241 | 11/1955 | De Groote et al. | 260—47 |
| 2,830,038 | 4/1958 | Pattison | 260—47 |
| 2,831,830 | 4/1958 | Schroedar | 260—47 |
| 2,864,775 | 12/1958 | Newey | 260—47 |
| 2,878,234 | 3/1959 | Peterson | 260—47 |
| 2,935,488 | 5/1960 | Phillips et al. | 260—47 |
| 2,989,498 | 6/1961 | Mackenzie et al. | 260—47 |

WILLIAM H. SHORT, *Primary Examiner.*

HAROLD BURSTEIN, *Examiner.*

PHILIP E. MANGAN, D. A. HOES, T. D. KERWIN, A. LIEBERMAN, *Assistant Examiners.*